United States Patent
Yoshioka et al.

(10) Patent No.: US 7,555,953 B2
(45) Date of Patent: Jul. 7, 2009

(54) CONDITION-DETECTING DEVICE, METHOD, AND PROGRAM, AND INFORMATION-RECORDING MEDIUM

(75) Inventors: Takeo Yoshioka, Yamanashi (JP); Yoshiyuki Honjyo, Yamanashi (JP); Shigeo Watanabe, Yamanashi (JP)

(73) Assignee: THK Co., Ltd., Tokyo (JP)

( * ) Notice: Subject to any disclaimer, the term of this patent is extended or adjusted under 35 U.S.C. 154(b) by 408 days.

(21) Appl. No.: 10/547,356

(22) PCT Filed: Feb. 27, 2004

(86) PCT No.: PCT/JP2004/002398

§ 371 (c)(1),
(2), (4) Date: May 25, 2006

(87) PCT Pub. No.: WO2004/076874

PCT Pub. Date: Sep. 10, 2004

(65) Prior Publication Data
US 2006/0213272 A1 Sep. 28, 2006

(30) Foreign Application Priority Data
Feb. 28, 2003 (JP) ............................ 2003-054293

(51) Int. Cl.
*G01N 29/00* (2006.01)
(52) U.S. Cl. .............................. 73/587; 73/649; 73/652
(58) Field of Classification Search .................. 73/587, 73/105, 593, 649, 651, 652, 580, 584
See application file for complete search history.

(56) References Cited

U.S. PATENT DOCUMENTS

| | | | | |
|---|---|---|---|---|
| 4,763,523 A | * | 8/1988 | Womble et al. ............... 73/587 |
| 5,014,547 A | * | 5/1991 | Holroyd ...................... 73/105 |
| 5,597,965 A | * | 1/1997 | Endo et al. ............... 73/862.49 |
| 7,182,519 B2 | * | 2/2007 | Singh et al. ................ 384/448 |
| 2006/0101914 A1 | * | 5/2006 | McCoy ........................ 73/587 |
| 2006/0171625 A1 | * | 8/2006 | Jones et al. ................ 384/624 |
| 2007/0122070 A1 | * | 5/2007 | Singh et al. ................ 384/448 |
| 2008/0065354 A1 | * | 3/2008 | Yoshioka et al. ............ 702/183 |

FOREIGN PATENT DOCUMENTS

| | | |
|---|---|---|
| JP | 55-138616 | 10/1980 |
| JP | 57-194331 | 11/1982 |
| JP | 58-63831 | 4/1983 |
| JP | 58-63832 | 4/1983 |
| JP | 62-133023 | 8/1987 |
| JP | 63-297813 | 12/1988 |

(Continued)

*Primary Examiner*—Hezron E. Williams
*Assistant Examiner*—Jacques M. Saint-Surin
(74) *Attorney, Agent, or Firm*—Westerman, Hattori, Daniels & Adrian, LLP.

(57) ABSTRACT

There is provided a condition detection apparatus for detecting a present operating condition of a linear rolling motion guide apparatus, and the condition detection apparatus includes an AE sensor 1 for detecting a waveform elastically generated at least due to rolling of balls included in the linear rolling motion guide apparatus and mutual collision of the balls and generating an electric detection signal corresponding the detected waveform, a waveform shaping unit 2, an A/D converter 3, and a signal processing unit 4 judging a content of the operation condition in response to the generated detected signal Sae.

13 Claims, 7 Drawing Sheets

FOREIGN PATENT DOCUMENTS

| | | |
|---|---|---|
| JP | 1-172621 | 7/1989 |
| JP | 1-172622 | 7/1989 |
| JP | 9-210860 | 8/1997 |
| JP | 2002-22617 | 1/2002 |
| JP | 2002-340922 | 11/2002 |
| JP | 2003-56574 | 2/2003 |

* cited by examiner (a)

(b)

(c)

CONDITION-DETECTING DEVICE, METHOD, AND PROGRAM, AND INFORMATION-RECORDING MEDIUM

FIELD OF THE INVENTION

The present invention relates to a technical field of condition detection apparatus, condition detection method, condition detection program, and information recording medium, and more specifically, to a technical filed concerning condition detection apparatus and method for detecting a state in operation of a linear rolling motion guide apparatus when being driven and a condition detection program for detecting the operating condition thereof, and also to a technical field concerning an information recording medium recorded to be readable by a computer.

BACKGROUND ART

In the known art, there has been widely utilized a linear rolling motion guide apparatus including a rail, a movable block moving longitudinally on the rail, and a plurality of balls (rolling members) disposed between the rail and movable block for moving the movable block at a high accuracy while being rotating and circulating (revolving) itself. More specifically, such linear rolling motion guide apparatus has been utilized for a support member supporting three-dimensional motion of a work-table of a machine tool or supporting a pendulum motion of a pendulum electric car, or for an aseismatic structure of a building or like.

According to the widening of such usable fields of the linear rolling motion guide apparatus, there is an increased request for prevention of faults or like of the linear rolling motion guide apparatus from causing, and therefore, it has been required to provide a method of diagnosing an operation or operating condition thereof at a high accuracy.

Incidentally, general diagnostic methods of operating conditions of conventionally general machine systems, excluding the linear rolling motion guide apparatus, (for example, rotational rolling bearing including ball bearings and like) include: a vibration detecting method of diagnosing the operating condition by monitoring a vibration generating condition in the machine system; an oil evaluation method of diagnosing the operating condition by evaluating a quality of a lubrication oil used in the machine system; an electric resistance method of diagnosing the operating condition by measuring an electric resistance between members driven through the lubrication oil in the machine system; or a temperature measuring method of diagnosing the operating condition by measuring the temperature driven through the lubrication oil in the machine system by utilizing a thermocouple.

However, in a case where these diagnostic methods are applied to the linear rolling motion guide apparatus, the following problems have been raised.

That is, in the case of the vibration detecting method, when used for a linear rolling motion guide apparatus in which the balls as rolling members revolves in a circulation path while being rotated itself, so that many vibration generating sources exist other than an abnormal vibration generating source, and hence, the vibration which should be naturally detected cannot be accurately detected, thus providing a problem.

Further, in the case of the oil evaluation method, it is necessary to take out, for inspection, a lubrication oil before use in the linear rolling motion guide apparatus and a lubrication oil after the use therein, respectively, from the linear rolling motion guide apparatus as a target apparatus to be diagnosed, which requires much time for obtaining the diagnosed result, and it is also necessary to take out the lubrication oil by once stopping the operation of the linear rolling motion guide apparatus, thus reducing the working efficiency, also providing a problem.

Furthermore, the cases of the electric resistance method and the temperature measuring method are both not suitable to electric noises, and in addition, in a case where the movable block is moved at a low speed, the measurement itself is difficult, thus also providing a problem.

Accordingly, as mentioned above, in the conventional methods, it is difficult to accurately diagnose the operation or operating conditions of the linear rolling motion guide apparatus in a real time.

Then, present invention was therefore conceived in consideration of the above circumstances, and an object of the present invention is to provide a condition-detecting device and a condition-detecting method capable of foreseeing generation of fault in a linear rolling motion guide apparatus by accurately detecting an operation condition in a real time in the linear rolling motion guide apparatus, improving maneuverability, for user, of the linear rolling motion guide apparatus, elongating a usable life time and contributing to the quality improvement of devices or machineries incorporated with the linear rolling motion guide apparatus, to provide a program for the condition detection, and to provide an information recording medium in which the condition detection program is recorded to be readable by a computer.

DISCLOSURE OF THE INVENTION

In order to achieve the above object, the invention recited in claim 1 is a condition detection apparatus for detecting a present operation condition in a linear rolling motion guide apparatus comprising: detection means, such as AE (Acoustic Emission) sensor, for detecting a wave motion elastically generated on the basis of at least either one of contact or collision of a movable member or a track member to a rolling member contained in the linear rolling motion guide apparatus, contact or collision of a rolling surface to the rolling member contained in the linear rolling motion guide apparatus, or mutual contact or collision of the rolling members themselves, at a time when a plurality of rolling members contained in the linear rolling motion guide apparatus revolve in a circulation section therein, and generating an electric detection signal in accordance with the detected wave motion; and judgment means, such as signal processing unit, for judging a content of the present operation condition in response to the generated detection signal.

Accordingly, since the wave motion elastically generated by the operation of the linear rolling motion guide apparatus is detected to thereby detect the present operating condition thereof, the operating condition of the linear rolling motion guide apparatus can be detected in a real time without disassembling the apparatus while excluding influence of vibration caused by the operation of the apparatus.

In order to achieve the above object, the invention of claim 2 is the condition detection apparatus of claim 1, in which the judgment means comprises: periodicity judgment means, such as signal processing unit, for judging presence or absence of a periodicity in the generated detection signal; maximum value detection means, such as signal processing unit, for detecting a maximum value in the generated detection signal at a time when it is judged that the periodicity is present; maximum value judgment means, such as signal processing unit, for judging whether or not the detected maximum value is not less than a preliminarily set threshold value of the maximum value; and condition judgment means, such as signal processing unit, for judging that, when the detected maximum value is not less than the threshold value of the maximum value, the linear rolling motion guide apparatus falls in a lubrication fault condition and then announcing that fact.

Accordingly, in the case when the generated detected signal has the periodicity and the maximum value at the detected signal is not less than the threshold value of the maximum value, it is judged that the linear rolling motion guide apparatus falls in a lubrication fault condition and that fact is then announced, so that the generation of the lubrication fault in the linear rolling motion guide apparatus can be easily and precisely detected in a real time during the operation of the apparatus.

In order to achieve the above object, the invention of claim 3 is the condition detection apparatus of claim 1, in which the judgment means comprises: periodicity judgment means, such as signal processing unit, for judging presence or absence of a periodicity of the generated detection signal; maximum value detection means, such as signal processing unit, for detecting a maximum value in the generated detection signal at a time when it is judged that the periodicity is present; maximum value judgment means, such as signal processing unit, for judging whether or not the detected maximum value is not less than a preliminarily set threshold value of the maximum value; event ratio detection means, such as signal processing unit, for detecting an event ratio in the generated detection signal at a time when the detected maximum value is less than a threshold value of the maximum value; event ratio judgment means, such as signal processing unit, for judging whether or not the detected event ratio is not less than a preliminarily set threshold value of the event ratio; and condition judgment means, such as signal processing unit, for judging that, when the detected event ratio is less than the threshold value of the event value, the linear rolling motion guide apparatus is in a possibility of falling in a lubrication fault condition and then announcing that fact.

Accordingly, when the generated detected signal has the periodicity, the maximum value in the detected signal is less than the threshold value of the maximum value and the detected event ratio is less than the threshold value of the event value, it is judged that the linear rolling motion guide apparatus is in a possibility of falling in a lubrication fault condition and that fact is then announced, so that the possibility of the generation of the lubrication fault in the linear rolling motion guide apparatus can be detected easily and precisely in a real time during the operation of the apparatus.

In order to achieve the above object, the invention of claim 4 is the condition detection apparatus of claim 1, in which the judgment means comprises: periodicity judgment means, such as signal processing unit, for judging presence or absence of a periodicity of the generated detection signal; maximum value detection means, such as signal processing unit, for detecting a maximum value in the generated detection signal at a time when it is judged that the periodicity is present; maximum value judgment means, such as signal processing unit, for judging whether or not the detected maximum value is not less than a preliminarily set threshold value of the maximum value; event ratio detection means, such as signal processing unit, for detecting an event ratio in the generated detection signal at a time when the detected maximum value is less than a threshold value of the maximum value; event ratio judgment means, such as signal processing unit, for judging whether or not the detected event ratio is not less than a preliminarily set threshold value of the event ratio; and condition judgment means, such as signal processing unit, for judging that, when the detected event ratio is not less than the threshold value of the event value, a flaking is generated in the linear rolling motion guide apparatus and then announcing that fact.

Accordingly, when the generated detected signal has the periodicity, the maximum value in the detected signal is less than the threshold value of the maximum value and the detected event ratio is not less than the threshold value of the event value, it is judged that a flaking is generated in the linear rolling motion guide apparatus and that fact is then announced, so that the generation of the flaking in the linear rolling motion guide apparatus can be detected easily and precisely in a real time during the operation of the apparatus.

In order to achieve the above object, the invention of claim 5 is the condition detection apparatus of claim 1, in which the judgment means comprises: periodicity judgment means, such as signal processing unit, for judging presence or absence of a periodicity of the detected detection signal; effective value detection means, such as signal processing unit, for detecting an effective value of the detected detection signal at a time when it is judged that the periodicity is absent; effective value judgment means, such as signal processing unit, for judging whether or not the detected effective value is not less than a preliminarily set threshold value of the effective value; and condition judgment means, such as signal processing unit, for judging that, when the detected effective value is not less than the threshold value of the effective value, a foreign material invades in the linear rolling motion guide apparatus and then announcing that fact.

Accordingly, when the generated detected signal has no periodicity, and the effective value in the detected signal is not less than the threshold value of the effective value, it is judged that a foreign material is invaded in the linear rolling motion guide apparatus and that fact is then announced, so that the generation of the case of the invasion of the foreign material in the linear rolling motion guide apparatus can be detected easily and precisely in a real time during the operation of the apparatus.

In order to achieve the above object, the invention of claim 6 is the condition detection apparatus of claim 1, in which the judgment means comprises: periodicity judgment means, such as signal processing unit, for judging presence or absence of a periodicity of the detected detection signal; effective value detection means, such as signal processing unit, for detecting an effective value of the detected detection signal at a time when it is judged that the periodicity is absent; effective value judgment means, such as signal processing unit, for judging whether or not the detected effective value is not less than a preliminarily set threshold value of the effective value; and condition judgment means, such as signal processing unit, for judging that, when the detected effective value is less than the threshold value of the effective value, a present operation condition is normal, and then announcing that fact.

Accordingly, when the generated detected signal has no periodicity and the effective value in the detected signal is less than the threshold value of the effective value, it is judged that the present operating condition is normal and that fact is then announced, so that it can be detected easily and precisely in a real time whether or not the operating condition in the linear rolling motion guide apparatus is normal.

In order to achieve the above object, the invention of claim 7 is the condition detection method for detecting the present operating condition in the linear rolling motion guide apparatus, comprising: a detection step for detecting a wave motion elastically generated on the basis of at least either one of contact or collision of a movable member or a track member to a rolling member contained in the linear rolling motion guide apparatus, contact or collision of a rolling surface to the rolling member contained in the linear rolling motion guide apparatus, or mutual contact or collision of the rolling members themselves, at a time when a plurality of rolling members contained in the linear rolling motion guide apparatus revolve in a circulation section therein, and generating an electric detection signal in accordance with the detected wave motion; and a judgment step for judging a content of the present operation condition in response to the generated detection signal.

Accordingly, since the wave motion elastically generated by the operation of the linear rolling motion guide apparatus is detected to thereby detect the present operating condition thereof, the operating condition of the linear rolling motion guide apparatus can be detected in a real time without disassembling the apparatus while excluding influence of vibration caused by the operation of the apparatus.

In order to achieve the above object, the invention of claim 8 is the condition detection method of claim 7, in which the judgment step comprises: a periodicity judgment step for judging presence or absence of a periodicity in the generated detection signal; a maximum value detection step for detecting a maximum value in the generated detection signal at a time when it is judged that the periodicity is present; a maximum value judgment step for judging whether or not the detected maximum value is not less than a preliminarily set threshold value of the maximum value; and a condition judgment step for judging that, when the detected maximum value is not less than the threshold value of the maximum value, the linear rolling motion guide apparatus falls in a lubrication fault condition and then announcing that fact.

Accordingly, in the case when the generated detected signal has the periodicity and the maximum value at the detected signal is not less than the threshold value of the maximum value, it is judged that the linear rolling motion guide apparatus falls in a lubrication fault condition and that fact is then announced, so that the generation of the lubrication fault in the linear rolling motion guide apparatus can be easily and precisely detected in a real time during the operation of the apparatus.

In order to achieve the above object, the invention of claim 9 is the condition detection method of claim 7, in which the judgment means step comprises: a periodicity judgment step for judging presence or absence of a periodicity of the generated detection signal; a maximum value detection step for detecting a maximum value in the generated detection signal at a time when it is judged that the periodicity is present; a maximum value judgment step for judging whether or not the detected maximum value is not less than a preliminarily set threshold value of the maximum value; an event ratio detection step for detecting an event ratio in the generated detection signal at a time when the detected maximum value is less than a threshold value of the maximum value; an event ratio judgment step for judging whether or not the detected event ratio is not less than a preliminarily set threshold value of the event ratio; and a condition judgment step for judging that, when the detected event ratio is less than the threshold value of the event value, the linear rolling motion guide apparatus is in a possibility of falling in a lubrication fault condition and then announcing that fact.

Accordingly, when the generated detected signal has the periodicity, the maximum value in the detected signal is less than the threshold value of the maximum value and the detected event ratio is less than the threshold value of the event value, it is judged that the linear rolling motion guide apparatus is in a possibility of falling in a lubrication fault condition and that fact is then announced, so that the possibility of the generation of the lubrication fault in the linear rolling motion guide apparatus can be detected easily and precisely in a real time during the operation of the apparatus.

In order to achieve the above object, the invention of claim 10 is the condition detection method of claim 7, in which the judgment step comprises: a periodicity judgment step for judging presence or absence of a periodicity of the generated detection signal; a maximum value detection step for detecting a maximum value in the generated detection signal at a time when it is judged that the periodicity is present; a maximum value judgment step for judging whether or not the detected maximum value is not less than a preliminarily set threshold value of the maximum value; an event ratio detection step for detecting an event ratio in the generated detection signal at a time when the detected maximum value is less than a threshold value of the maximum value; an event ratio judgment step for judging whether or not the detected event ratio is not less than a preliminarily set threshold value of the event ratio; and a condition judgment step for judging that, when the detected event ratio is not less than the threshold value of the event value, a flaking is generated in the linear rolling motion guide apparatus and then announcing that fact.

Accordingly, when the generated detected signal has the periodicity, the maximum value in the detected signal is less than the threshold value of the maximum value and the detected event ratio is not less than the threshold value of the event value, it is judged that a flaking is generated in the linear rolling motion guide apparatus and that fact is then announced, so that the generation of the flaking in the linear rolling motion guide apparatus can be detected easily and precisely in a real time during the operation of the apparatus.

In order to achieve the above object, the invention of claim 11 is the condition detection method of claim 7, in which the judgment step comprises: a periodicity judgment step for judging presence or absence of a periodicity of the detected detection signal; an effective value detection step for detecting an effective value of the detected detection signal at a time when it is judged that the periodicity is absent; an effective value judgment step for judging whether or not the detected effective value is not less than a preliminarily set threshold value of the effective value; and a condition judgment step for judging that, when the detected effective value is not less than the threshold value of the effective value, a foreign material invades in the linear rolling motion guide apparatus and then announcing that fact.

Accordingly, when the generated detected signal has no periodicity, and the effective value in the detected signal is not less than the threshold value of the effective value, it is judged that a foreign material is invaded in the linear rolling motion guide apparatus and that fact is then announced, so that the generation of the case of the invasion of the foreign material in the linear rolling motion guide apparatus can be detected easily and precisely in a real time during the operation of the apparatus.

In order to achieve the above object, the invention of claim 12 is the condition detection method of claim 7, in which the judgment step comprises: a periodicity judgment step for judging presence or absence of a periodicity of the detected detection signal; an effective value detection step for detecting an effective value of the detected detection signal at a time when it is judged that the periodicity is absent; an effective value judgment step for judging whether or not the detected effective value is not less than a preliminarily set threshold value of the effective value; and a condition judgment step for judging that, when the detected effective value is less than the threshold value of the effective value, a present operation condition is normal and then announcing that fact.

Accordingly, when the generated detected signal has no periodicity and the effective value in the detected signal is less than the threshold value of the effective value, it is judged that the present operating condition is normal and that fact is then announced, so that it can be detected easily and precisely in a real time whether or not the operating condition in the linear rolling motion guide apparatus is normal.

In order to achieve the above object, the invention of claim 13 is a condition detection program, wherein a condition detection apparatus for detecting a present operation condition in a linear rolling motion guide apparatus, which includes detection means for detecting a wave motion elastically generated on the basis of at least either one of contact or collision of a movable member or a track member to a rolling member contained in the linear rolling motion guide apparatus, contact or collision of a rolling surface to the rolling member contained in the linear rolling motion guide apparatus, or mutual contact or collision of the rolling members themselves, at a time when a plurality of rolling members contained in the linear rolling motion guide apparatus revolve in a circulation section therein, and generating an electric detection signal in accordance with the detected wave motion, includes a computer which is operated as judgment means for judging a content of the operation condition in response to the generated detected signal.

Accordingly, since the computer functions so as to detect the wave motion elastically generated by the operation of the linear rolling motion guide apparatus and to thereby detect the present operating condition thereof, the operating condition of the linear rolling motion guide apparatus can be detected in a real time without disassembling the apparatus while excluding influence of vibration caused by the operation of the apparatus.

In order to achieve the above object, the invention of claim 14 is an information recording medium, wherein the condition detection program as claimed in claim 13 is recorded to be readable by the computer.

Accordingly, at the time of reading out and executing the program for the condition detection by utilizing the computer, since the computer functions so as to detect the wave motion elastically generated by the operation of the linear rolling motion guide apparatus and to thereby detect the present operating condition thereof, the operating condition of the linear rolling motion guide apparatus can be detected in a real time without disassembling the apparatus while excluding influence of vibration caused by the operation of the apparatus.

BEST MODE FOR EMBODYING THE INVENTION

Hereunder, a preferred embodiment of the present invention will be described with reference to the accompanying drawings.

Further, embodiments described hereinafter are ones in which the present invention is applied to detection and diagnosis of an operational (or operating) condition in a linear rolling motion guide apparatus (hereinafter, merely called LM "Linear Motion" System, more specifically, including a linear motion system such as so-called an LM guide, ball spline and the like).

(I) Principle of the Invention

Figure 1:
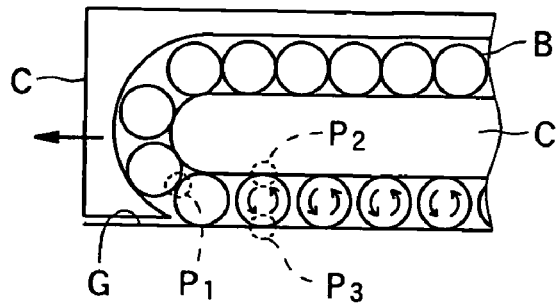
FIG. 1 is one for explaining the principle of the present invention, in which (a) and (b) are views showing generation of en extended AE wave according to an embodiment of the present invention and (c) is one example of envelope detection wave-shape corresponding to the extended AE wave.
Figure 1:
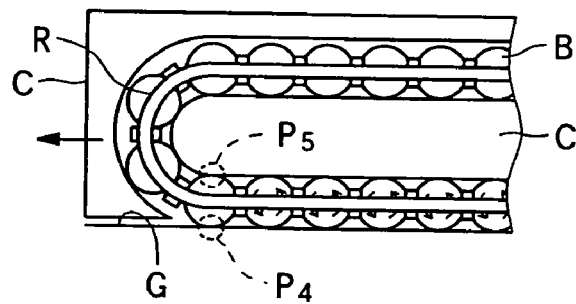
Figure 1:
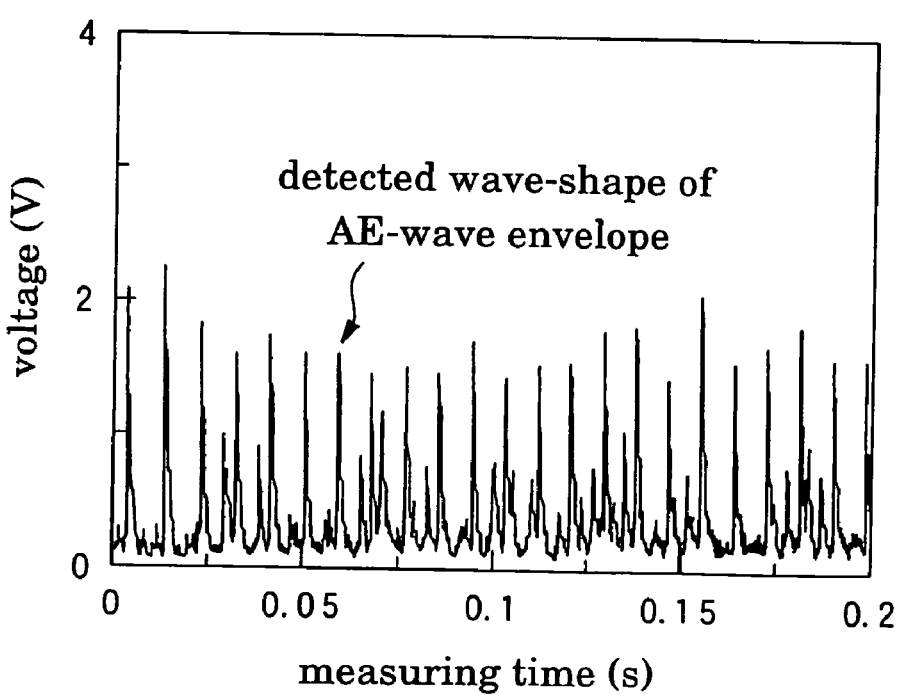

First, in advance of the concrete explanation of the embodiment of the present invention, the principle of the present invention will be described with reference to FIG. 1.

In a study of a diagnosis method of operating condition of an LM system of the type mentioned above, the inventor of the subject application was found that so-called an AE phenomenon could be utilized for the diagnosis of the operating condition of the LM system utilized for the diagnosis of fault of a conventional rolling roller bearing device.

That is, the inventor of the present invention was found through experiments that mutually different AE waves were caused in a case where the AE phenomena of different modes are caused with respect to various abnormal operating conditions (specifically, generation of lubrication defect and flaking (that is, peeling phenomenon on a ball surface as rolling member included in the LM system, or a guide surface as a track member to which the ball contacts), or mixing of foreign material), and according to such causing, various abnormal operating conditions were caused.

Here, such AE phenomena or phenomenon was defined in a conventional technology, as "phenomenon generating acoustic emission wave (AE wave) by releasing an elastic energy in accordance with destroy or deformation of a solid material" or "phenomenon generating an elastic wave following plastic deformation or crack generation inside a material". The inventor of the subject application, however, confirmed in addition thereto that the AE wave is also generated only by mutual collision of balls caused by the normal operation of the LM system through any plastic deformation or crack is not generated on the ball or guide surface.

More specifically, in the case of the LM system utilizing the movable block, as shown in FIG. 1(a), the ball B revolves, while rotating, in the rolling path formed in the movable block C, it was confirmed by the inventor that the AE wave is generated in each of the cases when the balls B collide with each other at the contact point P1, when the ball B and the movable block C collide at the contact point P2, and when the ball B and the rolling surface G collide at the contact point P3.

Further, as shown in FIG. 1(b), with respect to the case of the LM system utilizing the movable block, even in the case where not only the ball B but also so-called a retainer R is disposed in the rolling path, if the ball B revolves, while rotating, in the rolling path formed in the movable block C, it was confirmed by the inventor that the AE wave is generated in each of the cases when the ball B and the movable block C collide with each other at the contact point P5 and when the ball B and the rolling surface G collide with each other at the contact point P4.

The inventor then found that the generation modes of such AE waves were different from each other in accordance with kinds or types of the abnormal operating conditions mentioned hereinabove.

Further, as mentioned above, in the present invention, the generation of the AE phenomenon in a range wider than that of the AE phenomenon according to the conventional definition is promised, so that, in the following description, the AE phenomenon applied to the present invention is referred to as extended AE phenomenon, and the AE wave generated based on this extended AE phenomenon is referred to as extended AE wave.

Further, an electric signal corresponding to the extended AE wave has a frequency higher than a vibration or oscillation generally generated at an operating period of the LM system, and accordingly, for example, as shown in FIG. 1(c), it is possible to detect it separately from that vibration by the so-called envelope detection wave method, and it is thereby possible to detect the operating condition in real time during the operation of the LM system.

(II) Exemplary Embodiment

Hereunder, the exemplary embodiment of the present invention based on the above principle will be specifically explained with reference to FIGS. 2 to 7.

Figure 2:
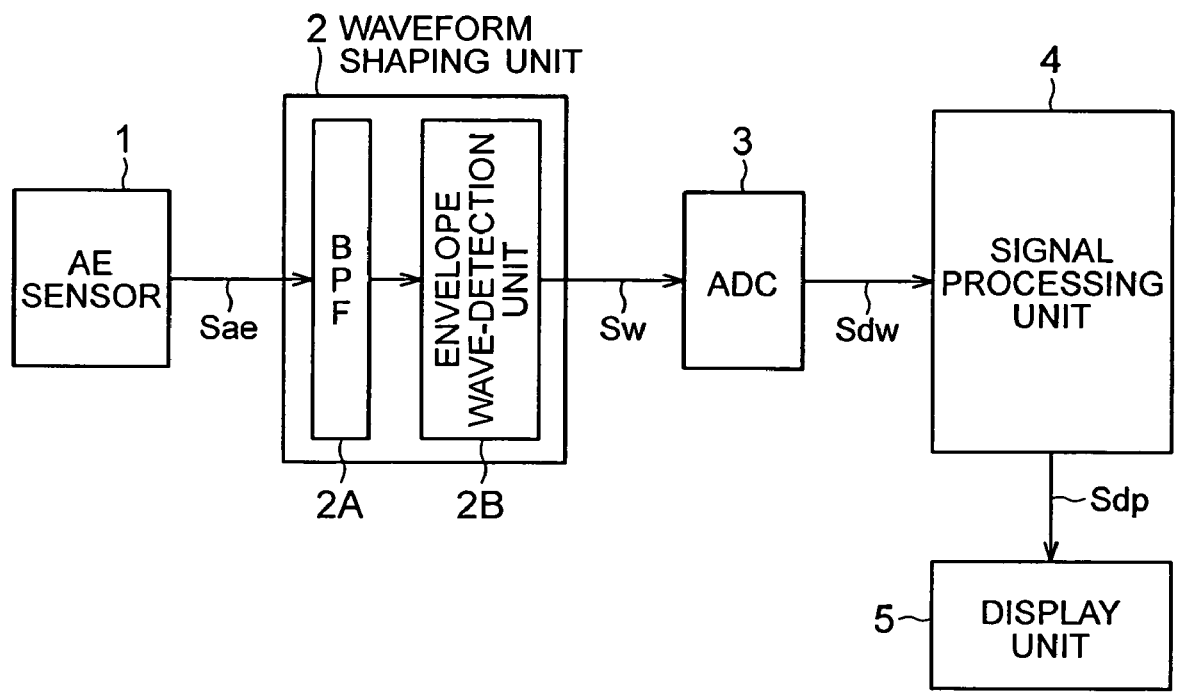
FIG. 2 is a block diagram showing a structure of the condition detection apparatus according to the embodiment of the present invention.
Figure 3:
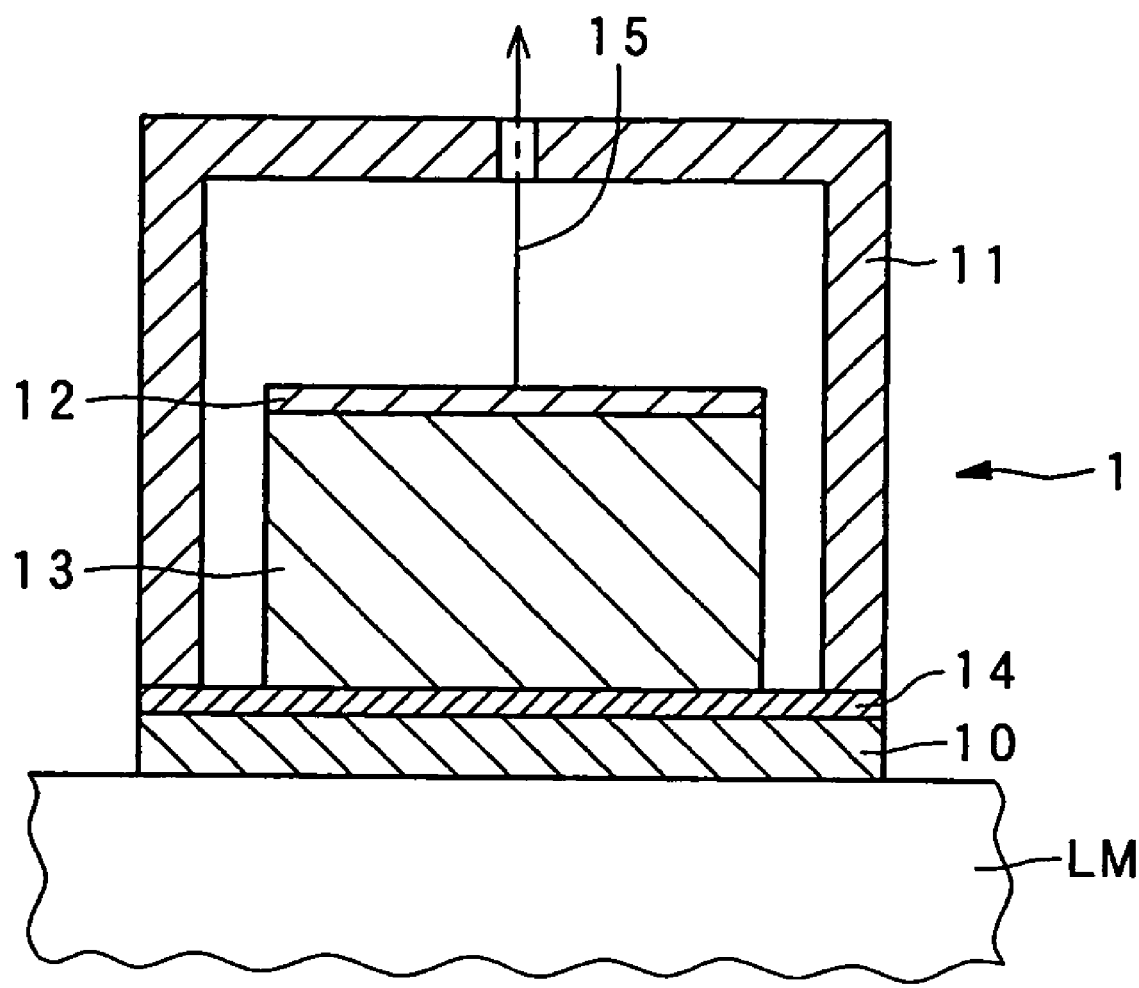
FIG. 3 is a elevational section of an AE sensor according to the embodiment of the present invention.
Figure 4:
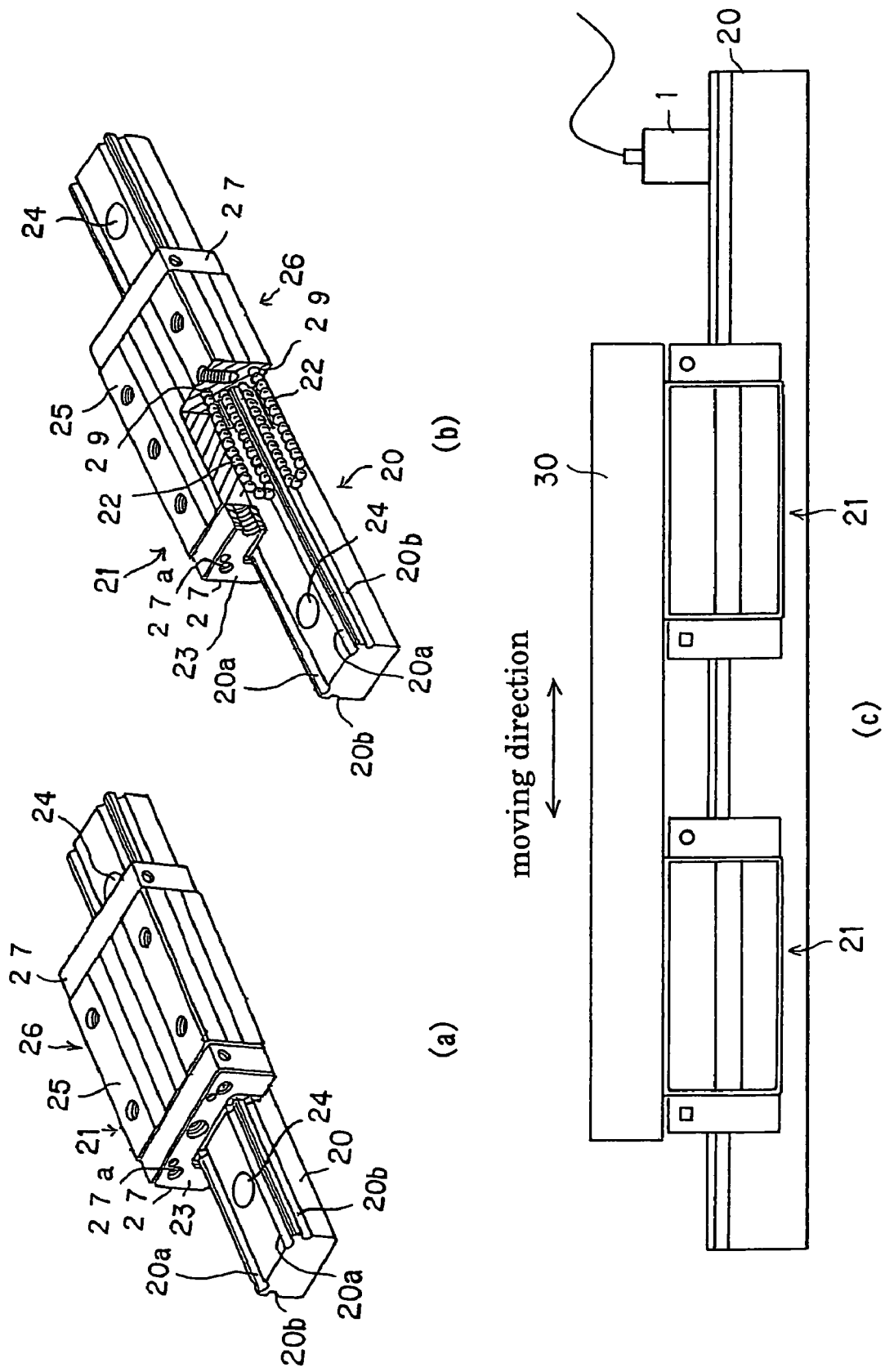
FIG. 4 is one (I) representing an installation example of the AE sensor according to the embodiment of the present invention, in which (a) is a perspective view of an outer appearance showing a structure of an LM system including a movable block, (b) is a perspective view showing an inner structure thereof, and (c) is a side view of an outer appearance of one example of a position in a case where the AE sensor is set to the LM system.
Figure 5:
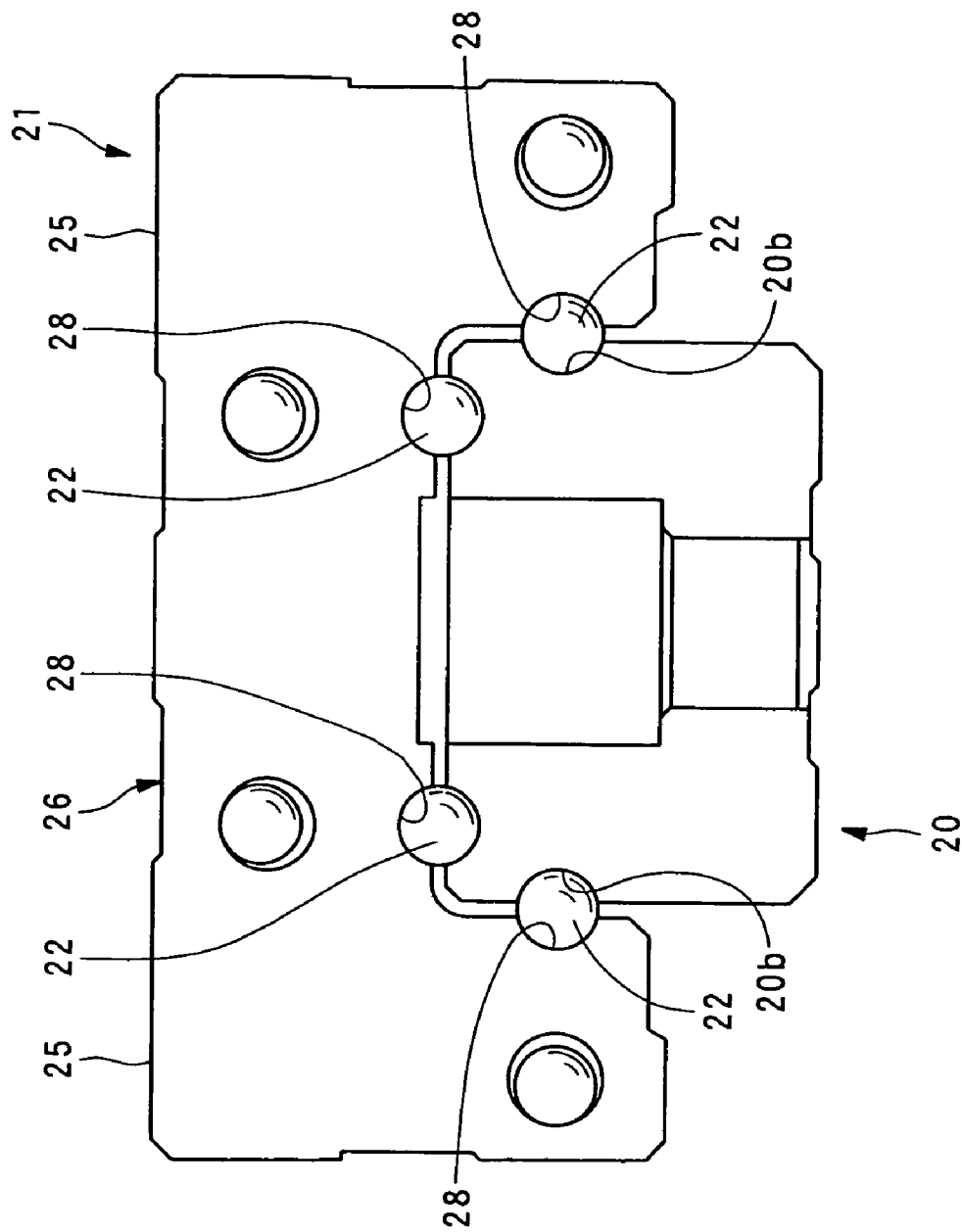
FIG. 5 is a side view of the LM system including the movable block according to the embodiment of the present invention.
Figure 6:
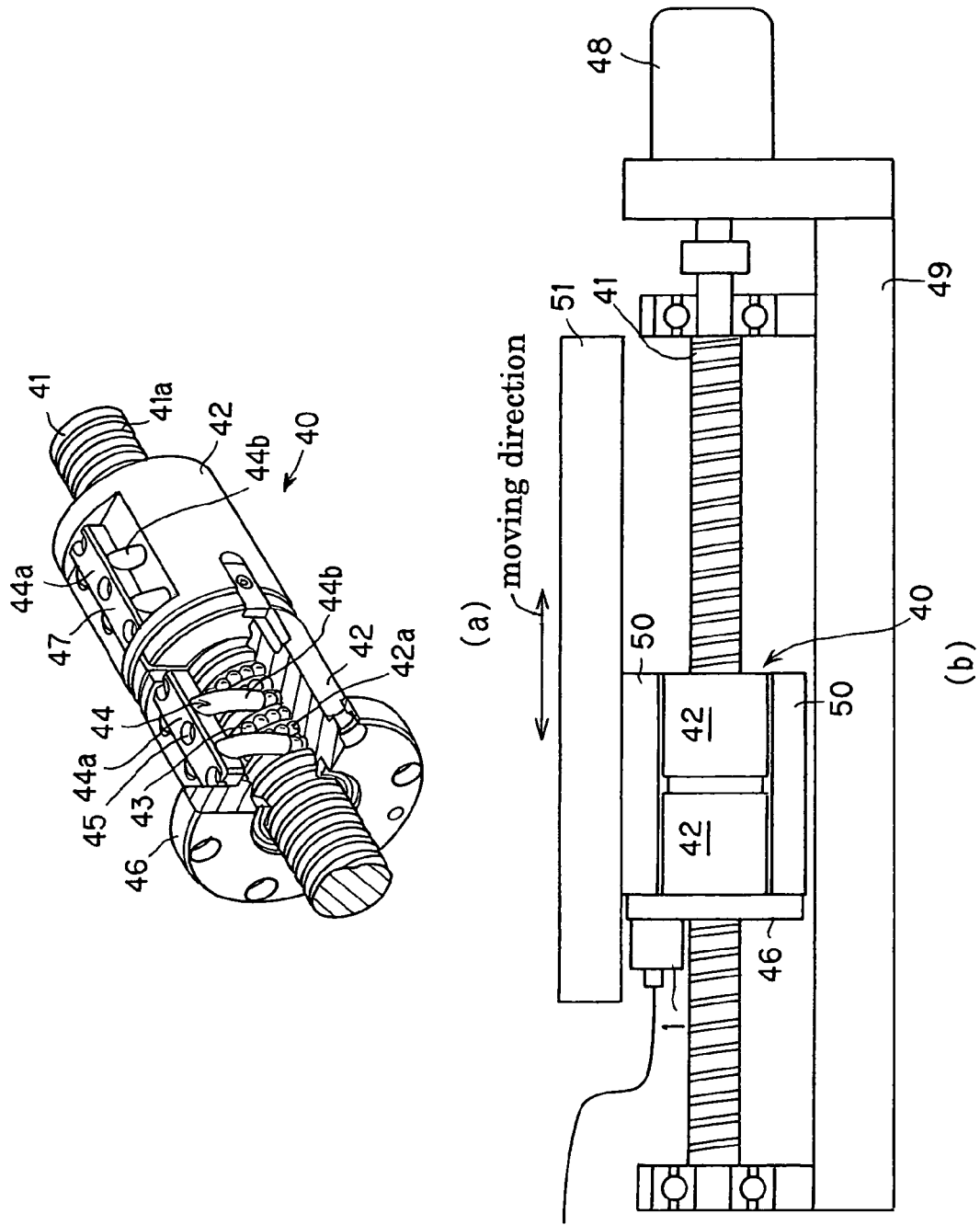
FIG. 6 is one (II) representing an installation example of the AE sensor according to the embodiment of the present invention, in which (a) is a perspective view of an outer appearance showing a structure of an LM system including a ball screw and (b) is a side view of an outer appearance of one example of a position in a case where the AE sensor is set to the LM system.
Figure 7:
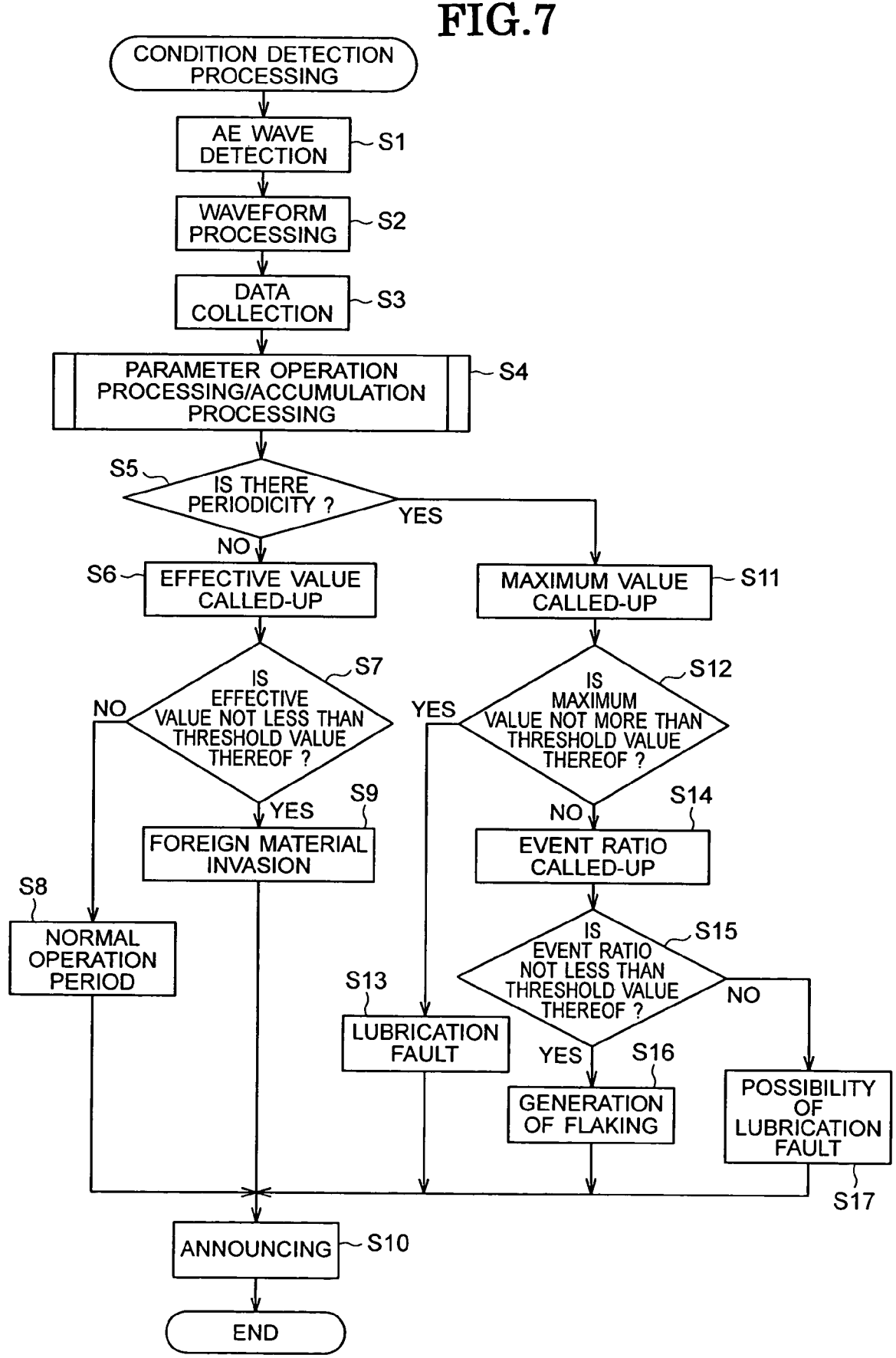
FIG. 7 shows a flowchart representing an operating condition detection procedure.

Herein, FIG. 2 is a block diagram showing a general structure of a condition diagnosis apparatus according to the embodiment of the present invention, FIG. 3 is an elevational section showing a general structure of an AE sensor detecting the extended AE wave according to the embodiment of the present invention, FIGS. 4 to 6 are views for explaining the LM system to which the present invention is applied, and FIG. 7 shows a flowchart representing an operating condition detection procedure executed by the condition diagnosis apparatus according to the present embodiment.

As shown in FIG. 2, a condition diagnosis apparatus S according to the present embodiment comprises an AE sensor 1, a waveform shaping unit 2 including a BPF (Band Pass Filter) 2A and an envelope detection section 2B, an A/D (analog-to-digital) converter 3, a signal processing unit 4 serving as periodicity judging means, maximum value detecting means, maximum value judging means, condition judging means, event detection means, event judging means, effective value detecting means and effective value judging means, and a display unit 5 including a liquid crystal display and the like.

Next, operation of the embodiment will be described.

First, the AE sensor 1 is disposed at an optional position of the LM system which is an object to be diagnosed, for example, an end position of a rail or a position on a movable block as a movable member. The AE sensor 1 detects the extended AE wave generated by the operation of the LM system and outputs the detected AE wave to the waveform shaping unit 2 after the conversion into a detection signal Sae as analog signal.

Next, the BPF 2A in the waveform shaping unit 2 serves to remove a frequency component other than the extended AE wave from the detection signal Sae and generate it to the envelope detection section 2B. Herein, it is desirable to use an BPF, for example as a concrete example of this BPF 2A, capable of passing the frequency component more than 100 kHz and less than 1 MHz as pass frequency band area with respect to the detection signal Sae in this BPF 2A.

The envelope detection section 2B serves to extract the envelope component based on the detection signal Sae and create an envelope signal Sw, which is then sent to the A/D converter 3.

Next, the A/D converter 3 serves to digitalize the envelope signal Sw as analog signal and create a digital envelope signal Sdw, which is then sent to the signal processing unit 4.

The signal processing unit 4 serves to judge the present operation (operating) condition in the LM system as the object to be diagnosed by the operation condition detection processing shown in FIG. 7, described hereinlater, based on the digital envelope signal Sdw, and a resulting judgment signal Sdp is created, which is then outputted to the display unit 5.

According to the operations mentioned above, the display unit 5 serves to display its content based on the judgment signal Sdp, thereby making it possible to grasp the operating condition of the LM system by a user thereof.

Next, the structure of the AE sensor 1 and its setting mode to the LM system as the object to be diagnosed will be explained hereunder with reference to FIGS. 3 to 6.

An inside structure of the AE sensor 1 will be first described with reference to FIG. 3.

As shown in FIG. 3, the AE sensor 1 has a circular cylindrical shape in its entire structure, and more specifically, is composed of a contact portion 10 arranged so as to contact a rail LM or like in the LM system, a casing 11, a piezoelectric element 13, silver evaporated thin films 12 and 14 deposited on upper and lower surfaces of the piezoelectric element 13, and an external line 15 through which the detection signal Sae, mentioned above, is outputted to the waveform shaping unit 2.

When the extended AE wave generated inside the LM system is transferred to the piezoelectric element 13 via the contact portion 10 and the silver thin film 14, the shape of the piezoelectric element 13 is minutely deformed by the extended AE wave, and hence, an electric potential difference is caused between the silver thin films 12 and 14, thus generating the detection signal Sae on the external line 15.

The AE sensor 1 having the structure mentioned above is installed to the LM system in the following manner with reference to FIGS. 4 to 6. Further, FIG. 4 and FIG. 5 are views representing examples at a time of installing the AE sensor 1 to the LM system using the movable block as an object to be diagnosed, and FIG. 6 is a view representing an example at a time of installing the AE sensor 1 to the LM system using the ball screw as an object to be diagnosed.

First, the case where the AE sensor 1 is mounted to the LM sensor utilizing the movable block will be explained with reference to FIGS. 4 and 5.

The LM system shown in FIGS. 4(a) and (b) is composed of a rail 20 provided with ball rolling grooves 20a and 20b along which balls 22 roll in the longitudinal direction as mentioned later, a movable block 21 engaged with the rail 20 through the number of balls 22 and provided, in its inside, with an endless circulation passage of the balls 22, and seal members 23 applied to both end surfaces of the movable block 21 in its moving direction so as to seal the upper and both side surfaces of the rail 20, and according to the circulation of the balls 22, the movable block 21 is reciprocally moved on the rail 20.

As shown in these figures, the rail 20 has substantially a rectangular shape in section and formed with attachment holes 24 for inserting fastening bolts, the holes being formed through out the rail 20 in its longitudinal direction at an appropriate interval between adjacent ones. In addition, two rows of ball rolling grooves 20a are formed on the upper surface of the rail 20 so as to sandwich the attachment holes 24 therebetween, and on the other hand, further two rows of ball rolling grooves 20b are formed to the side surfaces of the rail 20, respectively. These four rows of ball rolling grooves are formed with a radius of curvature slightly larger than the radius of curvature of the spherical surface of the ball 22 so as to provide a relatively deep grope shape.

On the other hand, the movable block 21 is composed of a block body 26 provided with a mount surface 25 to which a movable member such as table 30, mentioned hereinlater, is mounted, and a pair of end plates 27, 27 fixed to both longitudinal end surface portions of the block body 26, and the lower side of the movable block 21 has a straddle shape, in section, having a recessed portion in its lower side into which the rail 20 is idly fitted.

Then, as shown FIG. 5, the block body 26 has a pair of skirt portions extending downward from a base, to which the mount surface 25 mentioned before is formed, or both the end portions of the base so as to provide a saddle shape in section, and four rows of loaded rolling grooves 28 are formed to the inside surfaces of the skirt portions and the lower surface of the rail 20 so as to correspond respectively to the ball rolling grooves 20a and 20b formed thereto. The balls 20 roll between the loaded rolling grooves 28 and the ball rolling grooves 20a and 20b while being loaded, whereby the movable block 21 is moved on the rail 20.

Now, back to FIGS. 4(a) and (b), the base and the skirt portions of the block body 26 are pierced as ball return bores 29 corresponding to the loaded rolling grooves 28, respectively, and these ball return bores 29 are coupled and communicated with the loaded rolling grooves 28, respectively, through direction changing passages having substantially U-shape, not shown, formed to the end plates 27, 27. That is, the direction changing passages scoop up balls 22 which have rolled on the loaded rolling grooves 28 of the block body 26 and feed the balls 22 to the ball return bores 29, and on the other hand, the direction changing passages also serve to feed the balls 22 from the ball return bores 29 again to the loaded rolling grooves 28. Accordingly, by fastening the end plates 27, 27 to the block body 26 by means of fastening bolts 21a, 21a, the endless circulation passage for the balls 22 is formed to the movable block 21.

Further, when the AE sensor 1 of the present embodiment is set to the LM system shown in FIGS. 4(a) and (b), as shown in FIG. 4(c) as an outer appearance side view, for example, in the case where the table 30 is set on a plurality of movable blocks 21 which linearly move on the track rail 20, the AE sensor 1 is placed on a position of the rail 20 outside the moving range of the movable block 21.

Next, the case where the AE sensor 1 is set to the LM system utilizing the ball screw will be explained with reference to FIG. 6.

As shown in FIG. 6(a), a ball screw 40 is provided with a screw shaft 41 having an outer peripheral surface in which a spiral ball rolling groove 41a is formed, a nut member 42 having an inner peripheral surface in which a spiral loaded rolling groove 42a is formed so as to correspond to the spiral ball rolling groove 41a, and a number of balls 43, 43,—rolling between the ball rolling groove 41a and the loaded rolling groove 42a. A loaded rolling passage is formed by and between he ball rolling groove 41a of the screw shaft 41 and the loaded rolling groove 42a of the nut member 42. The nut member 42 is mounted with two return pipes 44 as circulation members. The return pipes 44 connect one and the other ends of the loaded rolling passage so as to constitute a non-loaded return passage. The return pipes 44 has substantially gate-shaped arrangement having a central portion 44a and a pair of leg portions 44b, 44b on both sides of the central portion 44a. The paired leg portions 44b, 44b are inserted into the loaded rolling passage at a several-pitch interval. The return pipes 44 are fixed to the nut member 42 by coupling means such as bolts 45.

The spiral ball rolling groove 41a of the screw shaft 41 is formed, through a grinding working, rolling working or like working, in the outer peripheral surface thereof so as to provide a semi-circular cross section with a constant lead. The nut member 42 has substantially a cylindrical shape and is provided with a flanged portion 46 at one end for mounting the ball screw 40 to a machine or like. The loaded rolling groove 42a having a semi-circular sectional shape corresponding to the ball rolling groove 41a of the screw shaft 41 is formed to the inner peripheral surface of the nut member 42. The nut member 42 is provided with a flat surface portion 47 partially of an upper surface. A plurality of return pipe fitting holes, into which the leg portions 44b, 44b of the return pipes 44 are inserted, are formed to the flat surface portion 47 of the nut member 42.

Then, when the AE sensor 1 of the present embodiment is set to the LM system shown in FIG. 6(a), in the case where the ball screw 41 driven by a motor 48 is rotatably supported by a table 49, for example, as shown in FIG. 6(b) as an outer appearance view, and a table 51 is fixed to the ball screw 40 through a bracket 50, the AE sensor 1 is mounted to a surface of the flanged portion 46 perpendicular to the central axis of the ball screw 40.

In the followings, the operating condition detection processing according to the embodiment executed mainly by the signal processing unit 4 will be explained with reference to FIGS. 1, 2 and 7.

As shown in FIG. 7, in the case when the operating condition detection processing according to the embodiment of the present invention is executed during the operation of the LM guide being the object to be diagnosed, a required initial setting processing is first carried out. Next, the extended AE wave generated in accordance with the extended AE phenomenon during the LM system operation is detected by the AE sensor 1 (step S1), the detection signal Sae generated in response to the detected AE wave is subjected to the waveform shaping in the waveform shaping unit 2 (step S2), and the envelope signal Sw is created and sent as digital envelope signal Sdw, through the A/D converter 3, to the signal processing unit 4. Thereafter, the extended AE wave detection procedure (step S1) and the waveform shaping procedure (step S2) are repeated by required inspection times to thereby store the data concerning the digital envelope signal Sdw in a memory, not shown, in the signal processing unit 4 (step S3), and a parameter utilizing for respective judgments or discriminations are operated based on the stored data, which is then stored in the memory (step S4).

In this embodiment, this parameter specifically includes four parameters representing: presence or absence of periodicity of the data of the digital envelope signal Sdw; a maximum value in the digital envelop signal data in the detection period preliminarily set in accordance with the moving distance and moving speed in one direction in the movable block reciprocating motion, for example, included in the LM system as an object to be diagnosed; an effective value in the detection period; and the event ratio in the detection period.

More specifically, the periodicity of the data of the digital envelope signal Sdw is one that detected by means of frequency analysis of the frequency repeating contact to and separation from a rail surface in the case that the ball revolves in accordance with the operation of the LM system, which is specific to the case of detecting the operating condition of the LM system.

Further, the effective value mentioned above is obtained by squaring and then averaging the values of the digital envelope signals Sdw with respect to the detection period thereof.

Furthermore, the event ratio mentioned above is a parameter that represents the times (numbers), in one detection period, in which the value of the digital envelope signal Sdw exceeds the preset threshold value.

Upon the completion of the operation or calculation and accumulation of the respective parameters, it is judged or discriminated, in the signal processing unit 4, whether or not there exists the periodicity with respect to the values of the digital envelope signal Sdw with reference to the preset frequency analysis value (step S5).

In the judgment in the step S5, in a case that the periodicity is not detected, (i.e., NO, in step S5), the effective value of the digital envelope signal Sdw is called up from the memory (step S6).

Then, it is judged whether the call-up effective value exceeds the threshold value of the effective value as a threshold value which was experimentally preset for the judgment whether a foreign material is included or operation is normally performed (step S7).

Next, in the judgment in the step S7, in a case that the called-up effective value is less than the threshold value of the effective value (i.e., NO in step S7), it is judged that the LM system now as an object to be diagnosed is normally operated at the present stage (step S8), and this effect is displayed by using the display unit 5 (step S10). Then, a series of operation (operating) condition detection procedures has been completed.

On the other hand, in the judgment in the step S7, in the judgment in the step S7, in a case that the called-up effective value is not less than the threshold value of the effective value (i.e., YES in step S7), it is judged that any foreign material is included in the LM system as an object to be diagnosed (step S9), and this effect is displayed by using the display unit 5 (step S10). Then, a series of operation (operating) condition detection procedures has been completed.

Further, in the judgment in the step S5, in the case that the periodicity is detected (i.e., YES in step S5), the maximum value in the digital envelope signal Sdw is called up from the memory (step S11), and then, it is judged whether the called-up maximum value exceeds the threshold value of the maximum value as a threshold value which was experimentally preset for the judgment whether any lubrication fault is caused at the present stage (step S12).

In this judgment, in the case that the called-up maximum value is not less than the threshold value of the maximum value (i.e., YES in step S12), it is judged that the lubrication fault is caused at the present stage in the LM system as an object to be diagnosed (step S13), and this effect is displayed by using the display unit 5 (step S10). Then, a series of operation (operating) condition detection procedures has been completed.

Next, in the judgment in the step S12, in the case that the called-up maximum value is less than the threshold value of the maximum value (i.e., NO in step S12), the event ratio mentioned before to the digital envelope signal Sdw is called up from the memory (step S14).

Then, in order to judge or discriminate whether there is a possibility of generation of the flaking or lubrication fault in the LM system as the object to be diagnosed, it is judged whether or not the called-up event ratio is not less than the threshold value of the event ratio experimentally preset (step S15).

Next, in the judgment in step S15, in the case that the called-up event ratio is less than the threshold value of the event ratio (i.e., NO in step S15), it is judged that there is high possibility of causing the lubrication fault at the present stage in the LM system as an object to be diagnosed (step S17), and this effect is displayed by using the display unit 5 (step S10). Then, a series of operation (operating) condition detection procedures has been completed. Further, the degree of the lubrication fault judged in the step S17 differs from the degree of the lubrication fault judged in the step S13, and the former (case of the step S17) only judges the possibility of the causing of the lubrication fault, and on the other hand, the latter (case of the step S13) can judge the surly causing of the lubrication fault.

Moreover, in the judgment in the step S15, in the case that the called-up event ratio is not less than the threshold value of the event ratio (i.e., YES in step S15), it is judged that the flaking is generated at the present stage in the LM system as an object to be diagnosed (step S16), and this effect is displayed by using the display unit 5 (step S10). Then, a series of operation (operating) condition detection procedures has been completed.

Further, the described series of operation condition detection result is displayed, accumulated in the memory in the signal processing unit 4 and then statistically processed, thereby detecting worsening of the operating condition and obviating the generation of faults.

As mentioned above, according to the operation of the condition diagnosing apparatus S of the present embodiment, since the present operating condition of the LM system can be detected by detecting the extended AE wave generated in accordance with the operation of the LM system, the operating condition can be detected during the operation thereof in a real time, without disassembling the LM system, while excluding influence due to vibration based on the operation of the LM system.

Therefore, it becomes possible to foresee the generation or causing of faults in the LM system, thus improving the maneuverability for a user of the LM system and elongating the usable life time thereof and improving the quality of devices or machineries manufactured by utilizing this LM system.

Furthermore, in the case that the generated digital envelope signal Sdw has the periodicity and the maximum value of this digital envelope signal Sdw is not less than the threshold value of the maximum value, it is judged that the LM system now falls in lubrication fault condition, which is then announced, so that the generation of the lubrication fault condition in the LM system can be precisely detected in a real time during the operation thereof.

Still furthermore, in the case that the generated digital envelope signal Sdw has the periodicity and the maximum value of this digital envelope signal Sdw is less than the threshold value of the maximum value, and that the event ratio of the digital envelope signal Sdw is less than the threshold value of the event ratio, it is judged that the LM system may have a possibility of falling in the lubrication fault condition, which is then announced, so that the possibility of the generation of the lubrication fault condition in the LM system can be precisely detected in a real time during the operation thereof.

Still furthermore, in the case that the generated digital envelope signal Sdw has the periodicity and the maximum value of this digital envelope signal Sdw is less than the threshold value of the maximum value, and that the event ratio of the digital envelope signal Sdw is not less than the threshold value of the event ratio, it is judged that the flaking is caused in the LM system, which is then announced, so that the generation of the flaking in the LM system can be easily and precisely detected in a real time during the operation thereof.

Still furthermore, in the case that the generated digital envelope signal Sdw has no periodicity and the effective value of this digital envelope signal Sdw is not less than the threshold value of the effective value, it is judged that the foreign material invades in the LM system, which is then announced, so that the generation of the invasion of the foreign material into the LM system can be easily and precisely detected in a real time during the operation thereof.

Still furthermore, in the case that the generated digital envelope signal Sdw has no periodicity and the effective value of this digital envelope signal Sdw is less than the threshold value of the effective value, it is judged that the LM system is now in the normally operating condition, which is then announced, so that the it can be easily and precisely detected in a real time whether the operating condition at the digital envelope signal Sdw is normal or not.

Further, by recording a program corresponding to the flowchart shown in FIG. 7 to an information recording medium such as flexible disk or hard disk, or recording the program obtained by means of network such as internet, and reading out and then executing the program by a general-use (general) micro-computer, this micro-computer can be operated as the signal processing unit 4 in this embodiment. In this case, the AE sensor 1, the waveform shaping unit 2 and the A/D converter 3, which are mentioned hereinbefore, will be connected to the micro-computer as external-type devices.

Furthermore, in the above-mentioned embodiment, the condition detection apparatus S shown in FIG. 2 is constructed as an apparatus having single structure, and more specifically, this embodiment is applied to a case that the present condition diagnosis apparatus S is carried to a site such as factory in which the LM system as the object to be diagnosed and is utilized at that site for detecting and diagnosing the operating condition of the LM system.

Further, other than the above-mentioned embodiment, the condition detection apparatus S of this embodiment may be applied to a case of detecting and diagnosing the operating condition of the LM system by usually providing the condition diagnosing apparatus S to a site such as factory in which the LM system as the object to be diagnosed are set and remotely controlling the condition diagnosing apparatus S through a telephone line or like by a diagnosing staff from an isolated position.

Furthermore, the present invention may be applied to a case that the condition diagnosing apparatus S is usually provided to a site such as factory in which the LM system as the object to be diagnosed is set and used, the operating condition of the LM system is automatically detected and diagnosed in the condition diagnosing apparatus S, in parallel to this operation, the detected result is transferred to another place, then accumulated there, and an accumulative fault diagnosing is executed on the basis of the accumulated detected result.

Still furthermore, in the described embodiment, although the condition detection apparatus S is composed such that one waveform shaping unit 2, one A/D converter 3, one signal processing unit 4 and one display unit 5 are utilized for one AE sensor 1, there may be provided another example of the structure, other than the above, in which the detection signals Sae from a plurality of AE sensors 1 are inputted through a switching circuit into one waveform shaping unit 2 and processed by utilizing one waveform shaping unit 2, one A/D converter 3, one signal processing unit and one display unit 5. In such example, it becomes necessary to synchronize the executing timing of the detection processing utilizing the waveform shaping unit 2, the A/D converter 3, the signal processing unit 4 and the display unit 5 with the take-in timing of the detection signal Sae from the corresponding AE sensor 1.

EXAMPLES

A specific example will be shown hereunder with respect to the frequency analysis value, the threshold value of the effective value, the threshold value of the maximum value and the threshold value of the event ratio, all mentioned hereinbefore, as the basis of the judgments in the steps S5, S7, S12 and S15, respectively.

Further, it is to be noted that examples of the respective threshold values shown hereunder are ones in the case where a mold of mold number SN55LR manufactured by the applicant is utilized as LM guide to which the AE sensor is set, an external load to the movable block is 0.1 C (14 kN), a stroke as moving distance of the movable block is 250 mm, a moving speed thereof is 24 m/min., the DTE26-type lubrication oil manufactured by Moville Oil. Ltd. is supplied as lubrication oil intermittently by a constant amount, a sample rate to the detection signal Sae is 10 kHz, and a measuring time is 0.4 second.

In accordance with the above respective conditions, as one example of the frequency analysis value, it is judged to have the periodicity in a case that a square voltage value (so-called V2 value) obtained through the FFT conversion of the digital envelope signal Sdw and, then, frequency analysis (power spectrum) exceeds $1.0 \times 10^{-9}$ (V2), and on the other hand, in a case of less than this value, it is judged not to have the periodicity.

Further, as one example of the threshold value of the effective value, as the effective value at the digital envelope signal Sdw, a value of $1.0 \times 10^{-4}$ (V) is suitable.

Furthermore, as one example of the threshold value of the maximum value, as the maximum value at the digital envelope signal Sdw, a value of $2.0 \times 10^{-3}$ (V) is suitable.

Finally, as one example of the threshold value of the event ratio, 5 to 7 times, at which the threshold value of the event ratio shows a value higher than a value of $5.0 \times 10^{-4}$ (V) at the digital envelope signal Sdw is suitable.

Further, the respective values in the above examples specifically change in accordance with the change of conditions, excluding the load with respect to the movable block and the stroke of the movable block from the conditions mentioned hereinabove.

Possibility of Industrial Usage

As mentioned above, according to the invention of claim 1, since the wave motion elastically generated by the operation of the linear rolling motion guide apparatus is detected to thereby detect the present operating condition thereof, the operating condition of the linear rolling motion guide apparatus can be detected in a real time without disassembling the apparatus while excluding influence of vibration caused by the operation of the apparatus.

Accordingly, the generation of a fault in the linear rolling motion guide apparatus can be foreseen, whereby the maintenance performance of the user using the linear rolling motion guide apparatus can be improved. In addition, the usable life time thereof can be elongated, and apparatus, machineries and the like manufactured by utilizing such linear rolling motion guide apparatus can be improved in their qualities.

According to the invention of claim 2, in addition to the effects of the invention of claim 1, in the case when the generated detected signal has the periodicity and the maximum value at the detected signal is not less than the threshold value of the maximum value, it is judged that the linear rolling motion guide apparatus falls in a lubrication fault condition and that fact is then announced, so that the generation of the lubrication fault in the linear rolling motion guide apparatus can be easily and precisely detected in a real time during the operation of the apparatus.

According to the invention of claim 3, in addition to the effects of the invention of claim 1, when the generated detected signal has the periodicity, the maximum value in the detected signal is less than the threshold value of the maximum value and the detected event ratio is less than the threshold value of the event value, it is judged that the linear rolling motion guide apparatus is in a possibility of falling in a lubrication fault condition and that fact is then announced, so that the possibility of the generation of the lubrication fault in the linear rolling motion guide apparatus can be detected easily and precisely in a real time during the operation of the apparatus.

According to the invention of claim 4, in addition to the effects of the invention of claim 1, when the generated detected signal has the periodicity, the maximum value in the detected signal is less than the threshold value of the maximum value and the detected event ratio is not less than the threshold value of the event value, it is judged that a flaking is generated in the linear rolling motion guide apparatus and that fact is then announced, so that the generation of the flaking in the linear rolling motion guide apparatus can be detected easily and precisely in a real time during the operation of the apparatus.

According to the invention of claim 5, in addition to the effects of the invention of claim 1, when the generated detected signal has no periodicity, and the effective value in the detected signal is not less than the threshold value of the effective value, it is judged that a foreign material is invaded in the linear rolling motion guide apparatus and that fact is then announced, so that the generation of the case of the invasion of the foreign material in the linear rolling motion guide apparatus can be detected easily and precisely in a real time during the operation of the apparatus.

According to the invention of claim 6, in addition to the effects of the invention of claim 1, when the generated detected signal has no periodicity and the effective value in the detected signal is less than the threshold value of the effective value, it is judged that the present operating condition is normal and that fact is then announced, so that it can be detected easily and precisely in a real time whether or not the operating condition in the linear rolling motion guide apparatus is normal.

According to the invention of claim 7, since the wave motion elastically generated by the operation of the linear rolling motion guide apparatus is detected to thereby detect the present operating condition thereof, the operating condition of the linear rolling motion guide apparatus can be detected in a real time without disassembling the apparatus while excluding influence of vibration caused by the operation of the apparatus.

Accordingly, the generation of a fault in the linear rolling motion guide apparatus can be foreseen, whereby the maintenance performance of the user using the linear rolling motion guide apparatus can be improved. In addition, the usable life time thereof can be elongated, and apparatus, machineries and the like manufactured by utilizing such linear rolling motion guide apparatus can be improved in their qualities.

According to the invention of claim 8, in addition to the effect of claim 7, in the case when the generated detected signal has the periodicity and the maximum value at the detected signal is not less than the threshold value of the maximum value, it is judged that the linear rolling motion guide apparatus falls in a lubrication fault condition and that fact is then announced, so that the generation of the lubrication fault in the linear rolling motion guide apparatus can be easily and precisely detected in a real time during the operation of the apparatus.

According to the invention of claim 9, in addition to the effect of claim 7, when the generated detected signal has the periodicity, the maximum value in the detected signal is less than the threshold value of the maximum value and the detected event ratio is less than the threshold value of the event value, it is judged that the linear rolling motion guide apparatus is in a possibility of falling in a lubrication fault condition and that fact is then announced, so that the possibility of the generation of the lubrication fault in the linear rolling motion guide apparatus can be detected easily and precisely in a real time during the operation of the apparatus.

According to the invention of claim 10, in addition to the effect of claim 7, when the generated detected signal has the periodicity, the maximum value in the detected signal is less than the threshold value of the maximum value and the detected event ratio is not less than the threshold value of the event value, it is judged that a flaking is generated in the linear rolling motion guide apparatus and that fact is then announced, so that the generation of the flaking in the linear rolling motion guide apparatus can be detected easily and precisely in a real time during the operation of the apparatus.

According to the invention of claim 11, in addition to the effect of claim 7, when the generated detected signal has no periodicity, and the effective value in the detected signal is not less than the threshold value of the effective value, it is judged that a foreign material is invaded in the linear rolling motion guide apparatus and that fact is then announced, so that the generation of the case of the invasion of the foreign material in the linear rolling motion guide apparatus can be detected easily and precisely in a real time during the operation of the apparatus.

According to the invention of claim 12, in addition to the effect of claim 7, when the generated detected signal has no periodicity and the effective value in the detected signal is less than the threshold value of the effective value, it is judged that the present operating condition is normal and that fact is then announced, so that it can be detected easily and precisely in a real time whether or not the operating condition in the linear rolling motion guide apparatus is normal.

According to the invention of claim 13, by reading out and executing the program for the condition detection by using the computer, the computer functions so as to detect the wave motion elastically generated by the operation of the linear rolling motion guide apparatus and to thereby detect the present operating condition thereof, so that the operating condition of the linear rolling motion guide apparatus can be detected in a real time without disassembling the apparatus while excluding influence of vibration caused by the operation of the apparatus.

Accordingly, the generation of a fault in the linear rolling motion guide apparatus can be foreseen, whereby the maintenance performance of the user using the linear rolling motion guide apparatus can be improved. In addition, the usable life time thereof can be elongated, and apparatus, machineries and the like manufactured by utilizing such linear rolling motion guide apparatus can be improved in their qualities.

According to the invention of claim 14, the program for the condition detection of claim 13 is recorded to be readable by the computer, and by reading out and executing the program for the condition detection by utilizing the computer, the computer functions so as to detect the wave motion elastically generated by the operation of the linear rolling motion guide apparatus and to thereby detect the present operating condition thereof, so that the operating condition of the linear rolling motion guide apparatus can be detected in a real time without disassembling the apparatus while excluding influence of vibration caused by the operation of the apparatus.

The invention claimed is:

1. A condition detection apparatus for detecting a present operation condition in a linear rolling motion guide apparatus comprising:

detection means for detecting a wave motion elastically generated on the basis of at least either one of contact or collision of a movable member or a track member to a rolling member contained in the linear rolling motion guide apparatus, contact or collision of a rolling surface to the rolling member contained in the linear rolling motion guide apparatus, or mutual contact or collision of the rolling members themselves, at a time when a plurality of rolling members contained in the linear rolling motion guide apparatus revolve in a circulation section therein, and generating an electric detection signal in accordance with the detected wave motion; and judgment means for judging a content of the present operation condition in response to the generated detection signal, wherein said judgment means comprises periodicity judgment means for judging presence or absence of a periodicity in the generated detection signal.

2. The condition detection apparatus according to claim 1, wherein said judgment means further comprises:

maximum value detection means for detecting a maximum value in the generated detection signal at a time when it is judged that the periodicity is present;

maximum value judgment means for judging whether or not the detected maximum value is not less than a preliminarily set threshold value of the maximum value; and condition judgment means for judging that, when the detected maximum value is not less than the threshold value of the maximum value, the linear rolling motion guide apparatus falls in a lubrication fault condition, and then announcing that fact.

3. The condition detection apparatus according to claim 1, wherein said judgment means further comprises:

maximum value detection means for detecting a maximum value in the generated detection signal at a time when it is judged that the periodicity is present;

maximum value judgment means for judging whether or not the detected maximum value is not less than a preliminarily set threshold value of the maximum value;

event ratio detection means for detecting an event ratio in the generated detection signal at a time when the detected maximum value is less than a threshold value of the maximum value;

event ratio judgment means for judging whether or not the detected event ratio is not less than a preliminarily set threshold value of the event ratio; and condition judgment means for judging that, when the detected event ratio is less than the threshold value of the event value, the linear rolling motion guide apparatus is in a possibility of falling in a lubrication fault condition, and then announcing that fact.

4. The condition detection apparatus according to claim 1, wherein said judgment means further comprises:

maximum value detection means for detecting a maximum value in the generated detection signal at a time when it is judged that the periodicity is present;

maximum value judgment means for judging whether or not the detected maximum value is not less than a preliminarily set threshold value of the maximum value;

event ratio detection means for detecting an event ratio in the generated detection signal at a time when the detected maximum value is less than a threshold value of the maximum value;

event ratio judgment means for judging whether or not the detected event ratio is not less than a preliminarily set threshold value of the event ratio; and condition judgment means for judging that, when the detected event ratio is not less than the threshold value of the event value, a flaking is generated in the linear rolling motion guide apparatus, and then announcing that fact.

5. The condition detection apparatus according to claim 1, wherein said judgment means further comprises:

effective value detection means for detecting an effective value of the detected detection signal at a time when it is judged that the periodicity is absent;

effective value judgment means for judging whether or not the detected effective value is not less than a preliminarily set threshold value of the effective value; and condition judgment means for judging that, when the detected effective value is not less than the threshold value of the effective value, a foreign material invades in the linear rolling motion guide apparatus, and then announcing that fact.

6. The condition detection apparatus according to claim 1, wherein said judgment means further comprises:

effective value detection means for detecting an effective value of the detected detection signal at a time when it is judged that the periodicity is absent;

effective value judgment means for judging whether or not the detected effective value is not less than a preliminarily set threshold value of the effective value; and condition judgment means for judging that, when the detected effective value is less than the threshold value of the effective value, a present operation condition is normal, and then announcing that fact.

7. A condition detection method for detecting a present operation condition in a linear rolling motion guide apparatus comprising:

a detection step for detecting a wave motion elastically generated on the basis of at least either one of contact or collision of a movable member or a track member to a rolling member contained in the linear rolling motion guide apparatus, contact or collision of a rolling surface to the rolling member contained in the linear rolling motion guide apparatus, or mutual contact or collision of the rolling members themselves, at a time when a plurality of rolling members contained in the linear rolling motion guide apparatus revolve in a circulation section therein, and generating an electric detection signal in accordance with the detected wave motion; and a judgment step for judging a content of the present operation condition in response to the generated detection signal, wherein said judgment step comprises a periodicity judgment step for judging presence or absence of a periodicity in the generated detection signal.

8. The condition detection method according to claim 7, wherein said judgment step further comprises:
   a maximum value detection step for detecting a maximum value in the generated detection signal at a time when it is judged that the periodicity is present;
   a maximum value judgment step for judging whether or not the detected maximum value is not less than a preliminarily set threshold value of the maximum value; and
   a condition judgment step for judging that, when the detected maximum value is not less than the threshold value of the maximum value, the linear rolling motion guide apparatus falls in a lubrication fault condition, and then announcing that fact.

9. The condition detection method according to claim 7, wherein said judgment step further comprises:
   a maximum value detection step for detecting a maximum value in the generated detection signal at a time when it is judged that the periodicity is present;
   a maximum value judgment step for judging whether or not the detected maximum value is not less than a preliminarily set threshold value of the maximum value;
   an event ratio detection step for detecting an event ratio in the generated detection signal at a time when the detected maximum value is less than a threshold value of the maximum value;
   an event ratio judgment step for judging whether or not the detected event ratio is not less than a preliminarily set threshold value of the event ratio; and
   a condition judgment step for judging that, when the detected event ratio is less than the threshold value of the event value, the linear rolling motion guide apparatus is in a possibility of falling in a lubrication fault condition, and then announcing that fact.

10. The condition detection method according to claim 7, wherein said judgment step further comprises:
    a maximum value detection step for detecting a maximum value in the generated detection signal at a time when it is judged that the periodicity is present;
    a maximum value judgment step for judging whether or not the detected maximum value is not less than a preliminarily set threshold value of the maximum value;
    an event ratio detection step for detecting an event ratio in the generated detection signal at a time when the detected maximum value is less than a threshold value of the maximum value;
    an event ratio judgment step for judging whether or not the detected event ratio is not less than a preliminarily set threshold value of the event ratio; and
    a condition judgment step for judging that, when the detected event ratio is not less than the threshold value of the event value, a flaking is generated in the linear rolling motion guide apparatus, and then announcing that fact.

11. The condition detection method according to claim 7, wherein said judgment step further comprises:
    an effective value detection step for detecting an effective value of the detected detection signal at a time when it is judged that the periodicity is absent;
    an effective value judgment step for judging whether or not the detected effective value is not less than a preliminarily set threshold value of the effective value; and
    a condition judgment step for judging that, when the detected effective value is not less than the threshold value of the effective value, a foreign material invades in the linear rolling motion guide apparatus and then announcing that fact.

12. The condition detection method according to claim 7, wherein said judgment step further comprises:
    an effective value detection step for detecting an effective value of the detected detection signal at a time when it is judged that the periodicity is absent;
    an effective value judgment step for judging whether or not the detected effective value is not less than a preliminarily set threshold value of the effective value; and
    a condition judgment step for judging that, when the detected effective value is less than the threshold value of the effective value, a present operation condition is normal and then announcing that fact.

13. A computer-readable medium having a computer program executable by a computer to perform the judgment means of claim 1.

* * * * *